United States Patent
Won et al.

(10) Patent No.: US 8,495,920 B2
(45) Date of Patent: Jul. 30, 2013

(54) LOAD MEASUREMENT APPARATUS ACTING ON PIPE SUPPORT

(75) Inventors: Youn Ho Won, Busan (KR); Chang Been Jeon, Gyeonggi-Do (KR)

(73) Assignee: Kepco Engineering & Construction Company, Gyeonggi-Do (KR)

(*) Notice: Subject to any disclaimer, the term of this patent is extended or adjusted under 35 U.S.C. 154(b) by 295 days.

(21) Appl. No.: 12/978,123

(22) Filed: Dec. 23, 2010

(65) Prior Publication Data

US 2011/0174085 A1 Jul. 21, 2011

(30) Foreign Application Priority Data

Jan. 15, 2010 (KR) .................. 10-2010-0003944

(51) Int. Cl.
*G01L 1/04* (2006.01)
(52) U.S. Cl.
USPC ........................................ 73/862.621; 73/856
(58) Field of Classification Search
USPC .................. 73/760, 818, 855–856, 862.621
See application file for complete search history.

(56) References Cited

U.S. PATENT DOCUMENTS

| | | | | |
|---|---|---|---|---|
| 4,341,119 A | * | 7/1982 | Jackson et al. | 73/462 |
| 5,992,241 A | * | 11/1999 | Posgay et al. | 73/779 |
| 6,680,443 B2 | * | 1/2004 | Dixon | 177/144 |
| 6,817,255 B2 | * | 11/2004 | Haque et al. | 73/862.638 |
| 2005/0203509 A1 | * | 9/2005 | Chinnaian et al. | 606/54 |

FOREIGN PATENT DOCUMENTS

| | | |
|---|---|---|
| CN | 2788160 | 6/2006 |
| CN | 201096572 | 8/2008 |
| CN | 101407247 | 4/2009 |
| JP | 6-30744 | 4/1994 |
| KR | 10-0224204 | 7/1999 |
| KR | 10 2000 0053668 A | 9/2000 |
| KR | 10-20000053668 | 9/2000 |
| WO | 03/001162 | 1/2003 |

OTHER PUBLICATIONS

Office Action for Korean Application No. 10-2010-0003944, dated Oct. 25, 2011.
Notice of Allowance for Korean Application No. 10-2010-0003944, dated May 30, 2012.
Office Action for Chinese Application No. 201010603916.8, Issued Aug. 27, 2012.

* cited by examiner

*Primary Examiner* — Max Noori
(74) *Attorney, Agent, or Firm* — Nixon Peabody LLP

(57) ABSTRACT

An apparatus for measuring load acting on pipe supports, the apparatus including a load cell which includes a contact portion contacting a pipe, and a measuring portion for measuring load acting from the pipe; and a gap sensor which measures a gap between the pipe support and the pipe, which is generated by a movement of the contact portion, wherein the load acting on the pipe support is measured based on the load measured by the load cell and the gap measured by the gap sensor.

3 Claims, 2 Drawing Sheets

1

LOAD MEASUREMENT APPARATUS ACTING ON PIPE SUPPORT

CROSS-REFERENCE TO RELATED PATENT APPLICATION

This application claims priority to Korean Patent Application No. 10-2010-0003944, filed on Jan. 15, 2010, in the Korean Intellectual Property Office, the disclosure of which is incorporated herein in its entirety by reference.

BACKGROUND OF THE INVENTION

1. Field of the Invention

The present invention relates to an apparatus for measuring load acting on pipe supports, and more particularly, to an apparatus for measuring load acting on pipe supports, which is to measure actual loads acting on not only a clamp and hanger rod typed pipe support but also a structural member (such as a beam) typed pipe support.

2. Description of the Related Art

Generally, pipe supports used in power plant and industry have not only a type of a clamp and hanger rod but also a type of a structural member such as a beam. An apparatus for measuring load for a clamp and hager rod typed pipe support has been invented, whereas an apparatus for measuring load for a structural member (such as a beam) typed pipe support has not been invented.

When a operating power plant is examined, it is observed that a pipe support using a structural member is in the air not contacting the pipe, or that a pipe support is deformed due to excessive load greater than a designed value. These two cases occur due to an installation error during construction of the pipe support, or due to deformation of the pipe support caused by excessive load generated in operating the power plant.

The pipe support being in the air not contacting the pipe does not support a load and transfers the load to an adjacent pipe supports. The load that acts on the adjacent pipe supports may exceed the designed value. The pipe support deformed due to the excessive load may be collapsed or destroy a pipe.

Thus, it is very required to accurately measure on the spot an actual load acting on a structural member (such as a beam) typed pipe support, and to examine whether the measured actual load exceeds the designed value. However, a measurement apparatus for a structural member (such as a beam) typed pipe support does not currently exist.

FIG. 1 illustrates a load measurement apparatus for performing a conventional method of measuring the load of a hanger installed on a pipe and evaluating the integrity of the hanger. The conventional method is disclosed in Korean Patent Publication No. 10-2000-0053668. Reference numerals not described herein will be referred to Korean Patent Publication No. 10-2000-0053668.

As illustrated in FIG. 1, conventional equipment for measuring load applied to the hanger that supports the pipe uses an auxiliary device that includes an oil pressure cylinder 31, a load cell 91, and upper and lower supports 41 and 49.

The conventional equipment is only applied to a clamp and hanger rod typed pipe support, and thus cannot measure an actual load acting on a structural member (such as a beam) typed pipe support. Moreover, since the conventional equipment needs the auxiliary device, the structure of the conventional equipment is complicated, and thus the time and costs are required to install the complicated conventional equipment increase.

SUMMARY OF THE INVENTION

The present invention provides an apparatus for measuring actual load acting on not only a clamp and hanger rod typed pipe support but also a structural member (such as a beam) typed pipe support.

The present invention also provides an apparatus for rapidly and accurately measuring actual load acting on pipe supports on the spot by having a simple and light-weight composition.

According to an aspect of the present invention, there is provided an apparatus for measuring load acting on pipe supports, the apparatus including a load cell which comprises a contact portion contacting a pipe, and a measuring portion for measuring load acting from the pipe; and a gap sensor which measures a gap between the pipe support and the pipe, which is generated by a movement of the contact portion, wherein the load acting on the pipe support is measured based on the load measured by the load cell and the gap measured by the gap sensor.

The contact portion may be installed on the load cell so as to be movable in a direction in which load is applied to the pipe and its opposite direction, and the load cell may include a moving means which moves the contact portion relative to the measuring portion.

The moving means may include a pair of screws which have screw threads in opposite directions and are installed to face each other and be separated from each other by a predetermined distance; and a handle which is coupled to the pair of screws so as to move the pair of screws far from and closely to each other.

The load cell may include a display portion which displays the load measured by the measuring portion and the gap measured by the gap sensor, using a 2-dimensional graph.

The apparatus for measuring load acting on pipe supports, according to the present invention, can accurately measure actual load acting on structural member (such as a beam) typed pipe supports and besides clamp and hanger rod typed pipe supports, even by having a simple composition as described above. Thus, the apparatus may be commonly used in the field of the technology of the present invention. The apparatus also may rapidly and accurately measure actual load acting on pipe supports on the spot.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

An apparatus for measuring load acting on pipe supports according to an embodiment of the present invention will now be described more fully with reference to the accompanying drawings.

Figure 1:
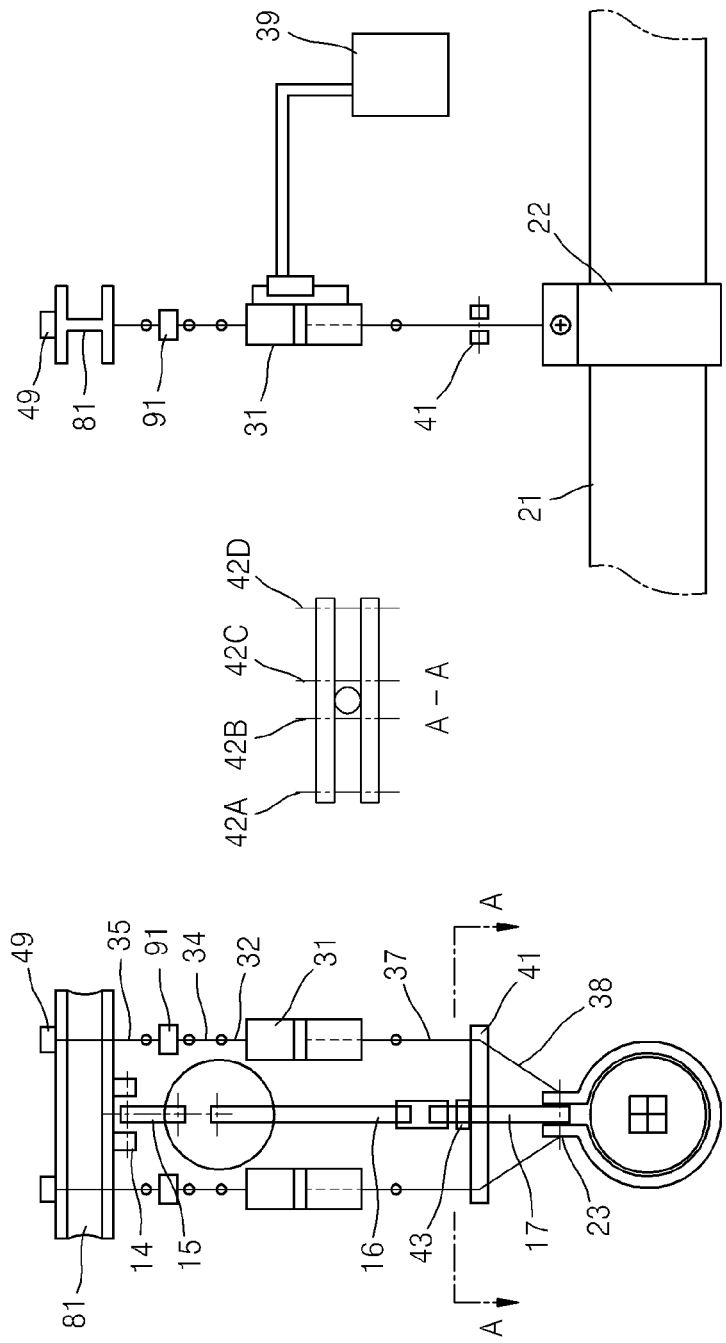
FIG. 1 is a schematic diagram of a conventional apparatus.
Figure 2:
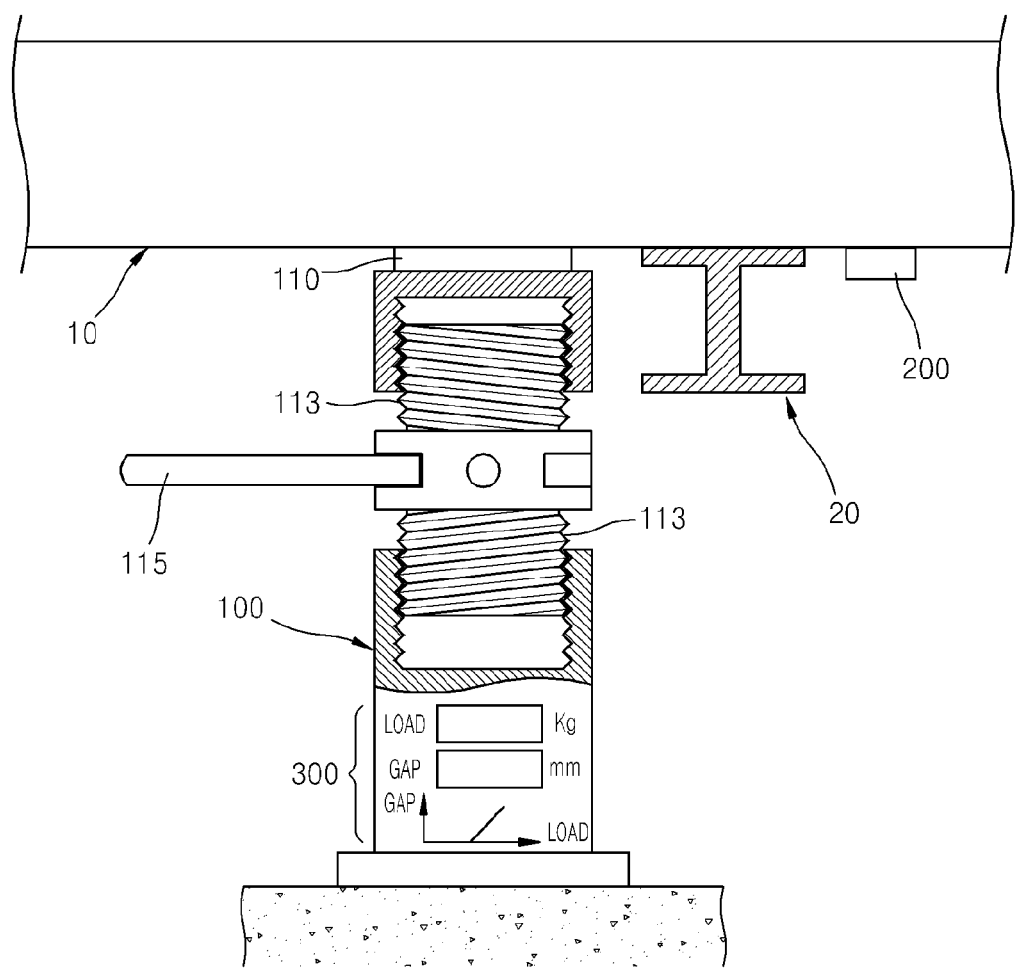
FIG. 2 is a partial cross-sectional view of an apparatus for measuring load acting on a pipe support, according to an embodiment of the present invention.

FIG. 2 is a partial cross-sectional view of an apparatus for measuring load acting on a pipe support 20, according to an embodiment of the present invention.

As illustrated in FIG. 2, the load measurement apparatus measures load acting on the pipe support 20 that supports a pipe 10, and includes a load cell 100 and a gap sensor 200.

The load cell 100 includes a contact portion 110 contacting the pipe 10, and a measuring portion (not shown) for measuring an acting load according to a well-known load measuring principle of a strain gauge.

In the present embodiment, the contact portion 110 is installed on the load cell 100 so as to be movable in a direction in which load is applied to the pipe 10 and its opposite direction, and ascends and descends by a moving means which will be described below. In other words, the load cell 100 includes the moving means for moving the contact portion 110 relatively to the measuring portion. Although the moving means may be formed in various types, the moving means may include a pair of screws 113 and a handle 115 so as to have a simple composition.

The pair of screws 113 have screw threads in opposite directions and are installed on the load cell 100 to face each other and be separated from each other by a predetermined distance. The handle 115 is coupled to the pair of screws 113 so as to move the pair of screws 113 so that the screws 113 are far from and closed to each other.

When the handle 115 rotates in a first direction, the screws 113 are far from each other and the contact portion 110 and the display portion 300 are moved far from each other. Thus, the pipe 10 ascends upward. To the contrary, when the handle 115 rotates in a second direction, the screws 113 are closed to each other and the contact portion 110 and the display portion 300 are moved close to each other. Thus, the pipe 10 descends downward. As such, in the present embodiment, load acting on the load cell 100 can be rapidly and accurately measured raising upward the pipe 10 by a simple composition and manipulation of the apparatus.

The gap sensor 200 measures a gap between the pipe support 20 and the pipe 10, which is generated as the contact portion 110 ascends and descends, and is electrically connected to the measuring portion.

In the present invention, load acting on the pipe support 20, which supports the pipe 10, may be rapidly and accurately measured based on a correlation between the gap measured by the gap sensor 200 and the load measured by the measuring portion.

As such, in the present invention, even by using simple compositions such as the load cell 100 and the gap sensor 200, actual load acting on not only a clamp and hanger rod typed pipe support 20 but also a structural member (such as a beam) typed pipe support 20 according to the present embodiment is accurately measured. Thus, load acting on the pipe support 20 may be rapidly and accurately measured on the spot by the simple composition of the apparatus for measuring load.

The load cell 100 may include a display portion 300 that displays the load measured by the measuring portion and the gap measured by the gap sensor 200 in a 2-dimensional graph.

A method of measuring the load acting on the pipe support 20 by using the apparatus having the above-described composition will now be described.

First, it is assumed that load acts downward in FIG. 2.

When the handle 115 of the load cell 100 is manipulated, the length of the load cell 100 increases due to a movement of the screws 113, while the pipe 10 gradually ascends. At this time, the load applied to the pipe support 20, which is an elastic body, is decreased by gradually transferring to the load cell 100, and the elastically deformed pipe support 20 is restored to the original shape.

Then, at the moment when the load applied to the pipe support 20 is entirely transferred to the load cell 100, the load applied to the pipe support 20 becomes zero. After this moment, as the pipe 10 ascends, a gap is generated between the pipe 10 and the pipe support 20 and is measured by the gap sensor 200.

The display portion 300 may display the load measured by the load cell 100 and the gap measured by the gap sensor 200 and also display a correlation between the load and the gap in a load-gap graph.

As the length of the load cell 100 increases, the load measured by the load cell 100 continues to increase even after the moment when the load applied to the pipe support 20 becomes zero, and the gap also continues to increase. The load-gap graph may be obtained by the increasing load and the gap and be displayed. Load applied immediately before the gap changes from a zero value to a plus value (i.e., when the gap is the last zero) may be read from the displayed load-gap graph. The read load is the actual load acting on the pipe support 20.

If the measured actual load acting on the pipe support 20 is less than a designed value, the pipe support 20 is needed to be raised up so that load is further applied to the pipe support 20. It may be accurately predicted from the load-gap graph how high the pipe support 20 is to be raised.

On the contrary, if the measured actual load acting on the pipe support 20 is greater than the designed value, the pipe support 20 is needed to be lowered down, and it may be accurately predicted from the load-gap graph how low the pipe support 20 is to be lowered.

On the other hand, as for clamp and hanger rod typed pipe supports a gap sensor may be located on a connection pin for connecting a clamp to a hanger and may measure a gap between the clamp and the hanger rod. An apparatus for measuring load acting on pipe supports according to the present invention, having the above-described composition, accurately measures actual load acting on not only a clamp and hanger rod typed pipe support but also a structural member (such as a beam) typed pipe support. Thus, the apparatus can be commonly used in the technical field of the present invention and can rapidly and accurately measure load acting on pipe supports.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for measuring load acting on pipe supports, the apparatus comprising:
    a load cell which comprises a contact portion contacting a pipe, and a measuring portion for measuring load acting from the pipe; and
    a gap sensor which measures a gap between the pipe support and the pipe, which is generated by a movement of the contact portion,
    wherein the load acting on the pipe support is measured based on the load measured by the load cell and the gap measured by the gap sensor, and
    wherein the contact portion is installed on the load cell so as to be movable in a direction in which load is applied to the pipe and an opposite direction, and the load cell includes a moving means which moves the contact portion relative to the measuring portion.

2. The apparatus of claim 1, wherein the moving means comprises:

a pair of screws which have screw threads in opposite directions and are installed to face each other and be separated from each other by a predetermined distance; and a handle which is coupled to the pair of screws so as to move the pair of screws far from and closely to each other.

3. The apparatus of claim 1, wherein the load cell comprises a display portion which displays the load measured by the measuring portion and the gap measured by the gap sensor, using a 2-dimensional graph.

* * * * *